United States Patent
Schuele et al.

(10) Patent No.: US 9,469,007 B2
(45) Date of Patent: Oct. 18, 2016

(54) HAND POWER TOOL

(71) Applicant: Robert Bosch GmbH, Stuttgart (DE)

(72) Inventors: Manfred Schuele, Sulzbach-Laufen (DE); Helmut Wanek, Kirchheim/Neckar (DE); Cornelius Boeck, Kirchheim (DE); Joachim Schadow, Stuttgart (DE); Joerg Maute, Sindelfingen (DE); Florian Esenwein, Leinfelden-Echterdingen (DE); Manfred Lutz, Filderstadt (DE); Daniel Barth, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/183,441

(22) Filed: Feb. 18, 2014

(65) Prior Publication Data

US 2014/0235145 A1    Aug. 21, 2014

(30) Foreign Application Priority Data

Feb. 19, 2013    (DE) .................. 10 2013 202 676

(51) Int. Cl.
*B24B 23/02* (2006.01)
*B23Q 11/12* (2006.01)
*B25F 5/00* (2006.01)

(52) U.S. Cl.
CPC ............ *B23Q 11/127* (2013.01); *B24B 23/02* (2013.01); *B24B 23/028* (2013.01); *B25F 5/008* (2013.01)

(58) Field of Classification Search
CPC ...... B24B 23/02; B24B 23/028; B23Q 11/12; B25F 5/008
USPC ................ 451/449, 358, 359, 7, 488, 53
See application file for complete search history.

(56) References Cited

U.S. PATENT DOCUMENTS

| | | | |
|---|---|---|---|
| 2008/0290745 A1* | 11/2008 | Riedl | 310/50 |
| 2009/0103263 A1* | 4/2009 | Fuchs et al. | 361/695 |
| 2009/0280731 A1* | 11/2009 | Nelson | B24B 23/005 451/359 |
| 2011/0006621 A1* | 1/2011 | Lau | B25F 5/008 310/50 |
| 2011/0171887 A1* | 7/2011 | Tanimoto et al. | 451/359 |
| 2012/0014065 A1* | 1/2012 | Haga et al. | 361/697 |
| 2012/0302147 A1* | 11/2012 | Trautner et al. | 451/488 |

FOREIGN PATENT DOCUMENTS

| | | |
|---|---|---|
| DE | 10 2007 000 290 A1 | 11/2008 |
| DE | 10 2007 000 524 A1 | 4/2009 |
| JP | 2008-125296 A | 5/2008 |

\* cited by examiner

*Primary Examiner* — Robert Rose
(74) *Attorney, Agent, or Firm* — Maginot, Moore & Beck LLP

(57) ABSTRACT

A hand power tool, in particular an angle grinder, includes a drive unit and an electronic unit. The hand power tool further includes an after-run cooling unit configured, at least partially, to cool the drive unit and/or the electronic unit substantially after an operating state of at least the drive unit.

14 Claims, 2 Drawing Sheets

HAND POWER TOOL

This application claims priority under 35 U.S.C. §119 to patent application No. DE 10 2013 202 676.5 filed on Feb. 19, 2013 in Germany, the disclosure of which is incorporated herein by reference in its entirety.

BACKGROUND

A hand power tool has already been proposed.

SUMMARY

The disclosure is based on a hand power tool, in particular an angle grinder, having a drive unit and having an electronic unit.

It is proposed that the hand power tool has an after-run cooling unit provided, at least partially, for cooling the drive unit and/or the electronic unit substantially after an operating state, at least of the drive unit. A "drive unit" in this context is to be understood to mean, in particular, a unit provided, at least partially, to drive an insert tool coupled to the hand power tool, in an operating state. "Provided" is to be understood to mean, in particular, specially designed, configured and/or specially equipped. The drive unit preferably comprises at least one electric motor. It is also conceivable, however, for the drive unit to be realized, at least partially, such that it can be driven pneumatically and/or in another manner considered appropriate by persons skilled in the art. An "electronic unit" in this context is to be understood to mean, in particular, a unit provided, at least partially, to control, in particular, the drive unit of the hand power tool, by open-loop and/or closed-loop control, at least when the hand power tool is in an operating state. Preferably, the electronic unit comprises at least one motor controller of the drive unit. The electronic unit preferably has electronic components such as, in particular, at least one transistor, at least one capacitor, at least one processor, particularly preferably at least one field-effect transistor (MOSFET) and/or at least one bipolar transistor, in particular having an insulated gate electrode (IGBT).

"Cooling" in this context is to be understood to mean, in particular, an at least partial removal of thermal energy that is produced and/or given off, in particular when the hand power tool is in an operating state, in particular from at least one heat-critical component of the hand power tool. A "heat-critical" component in this context is to be understood to mean, in particular, an element, a unit and/or a region of the hand power tool whose operation and/or function may be negatively affected by the thermal energy produced, in particular when the hand power tool is in an operating state, and/or may be destroyed, at least partially, by the thermal energy produced, in particular when the hand power tool is in an operating state. In a particularly preferred exemplary embodiment, in particular, the drive unit and/or the electronic unit comprises/comprise the at least one heat-critical component of the hand power tool. Alternatively or additionally, the cooling device may also be provided, at least partially, for cooling another unit considered appropriate by persons skilled in the art, and/or another element and/or region considered appropriate by persons skilled in the art, such as, in particular, a grip region, of the hand power tool.

"Substantially after an operating state" in this context is to be understood to mean, in particular, at least 15 seconds, preferably at least 30 seconds, preferably at least 45 seconds, and particularly preferably at least 60 seconds after an operating state and/or after switch-off of the drive unit and/or, in particular, after an output shaft of the drive unit has come to a standstill.

The design according to the disclosure makes it possible to achieve advantageously good cooling, and to avoid heat accumulation, thereby making it possible to achieve, in particular, an advantageously high power density of the hand power tool.

Moreover, it is proposed that the after-run cooling unit be provided, at least partially, for active cooling of the drive unit and/or of the electronic unit. "Active cooling" in this context is to be understood to mean, in particular, that thermal energy is carried away and/or routed away, at least partially, preferably at least almost completely, from a component to be cooled, in particular from the drive unit and/or from the electronic unit, in particular by means of a cooling stream. Preferably, by means of the active cooling, it is possible to achieve a removal of heat that, in particular, is at least 30%, preferably at least 50%, and particularly preferably at least 70% greater than in the case of a passive cooling such as, for example, an unforced and/or free convection cooling. As a result, an advantageously effective design of the after-run cooling unit can be achieved.

It is furthermore proposed that the hand power tool has a cooling unit provided, at least partially, for cooling the drive unit and/or the electronic unit when in an operating state. "Cooling" in this context is to be understood to mean, in particular, an at least partial removal of thermal energy that is produced and/or given off, in particular when the hand power tool is in an operating state, in particular from at least one heat-critical component of the hand power tool. A "heat-critical" component in this context is to be understood to mean, in particular, an element, a unit and/or a region of the hand power tool whose operation and/or function may be negatively affected by the thermal energy produced, in particular when the hand power tool is in an operating state, and/or may be destroyed, at least partially, by the thermal energy produced, in particular when the hand power tool is in an operating state. In a particularly preferred exemplary embodiment, in particular, the drive unit and/or the electronic unit comprises/comprise the at least one heat-critical component of the hand power tool. Alternatively or additionally, the cooling unit may also be provided, at least partially, to cool another unit considered appropriate by persons skilled in the art, and/or another element and/or region considered appropriate by persons skilled in the art, such as, in particular, a grip region, of the hand power tool. This makes it possible to achieve advantageously good cooling and consequently, in particular, an advantageously high power density of the hand power tool.

It is additionally proposed that the after-run cooling unit be realized so as to be at least partially integral with the cooling unit. "Partially integral" in this context is to be understood to mean, in particular, that the cooling unit and the after-run cooling unit have at least one common element, in particular at least two, advantageously at least three common elements that are a constituent part, in particular a functionally important constituent part, of the cooling unit and of the after-run cooling unit. This makes it possible to achieve an advantageously compact, light and preferably inexpensive design of the hand power tool.

Moreover, it is proposed that the hand power tool comprise an open-loop and/or closed-loop control unit, which is provided, at least partially, for temperature-dependent and/or time-dependent open-loop control and/or closed-loop control of the after-run cooling unit. "Temperature-dependent open-loop control and/or closed-loop control" in this context is to be understood to mean, in particular, setting of the after-run cooling unit, at least partially, in dependence on at least one temperature parameter. "Time-dependent open-loop control and/or closed-loop control" in this context is to be understood to mean, in particular, setting of the after-run cooling unit, at least partially, in dependence on at least one time parameter. This makes it possible to achieve cooling of the drive unit and/or of the electronic unit that is preferably well adapted to a requirement.

Moreover, it is proposed that the after-run cooling unit have at least one fan element. A "fan element" in this context is to be understood to mean, in particular, an element provided, at least partially, for generating at least one cooling stream, in particular a cooling airstream. In a particularly preferred exemplary embodiment, the fan element comprises a fan propeller. This makes it possible to achieve advantageous removal of thermal energy, in particular from a housing of the hand power tool, and consequently particularly advantageous cooling.

It is furthermore proposed that the after-run cooling unit comprise at least one air routing element. An "air routing element" in this context is to be understood to mean, in particular, an element provided, at least partially, to route a cooling airstream, at least partially, preferably at least almost completely, in particular selectively, to a location to be cooled, and/or to influence and/or alter and/or, in particular, deflect by at least 5°, preferably by at least 10°, and particularly preferably by at least 20° a direction of flow of the cooling airstream. It is also conceivable, however, for a routing element to be provided for routing other cooling media considered appropriate by persons skilled in the art, such as, for example, water, oil or similar. This makes it possible to achieve preferably selective, and therefore advantageously effective, cooling.

It is additionally proposed that the drive unit comprise at least one EC motor. An "EC motor" in this context is to be understood to mean, in particular, a brushless, electrically commutated motor. This makes it possible to achieve a preferably high-power, advantageously compact and inexpensive design of the drive unit of the hand power tool.

The hand power tool according to the disclosure is not intended in this case to be limited to the application and embodiment described above. In particular, the hand power tool according to the disclosure may have individual elements, components and units that differ in number from a number stated herein, in order to fulfill a principle of function described herein.

BRIEF DESCRIPTION OF THE DRAWINGS

Further advantages are given by the following description of the drawings. The drawings show an exemplary embodiment of the disclosure. The drawings, the description, and the claims contain numerous features in combination. Persons skilled in the art will also expediently consider the features individually and combine them to create appropriate further combinations.

In the drawings.

DETAILED DESCRIPTION

Figure 1:
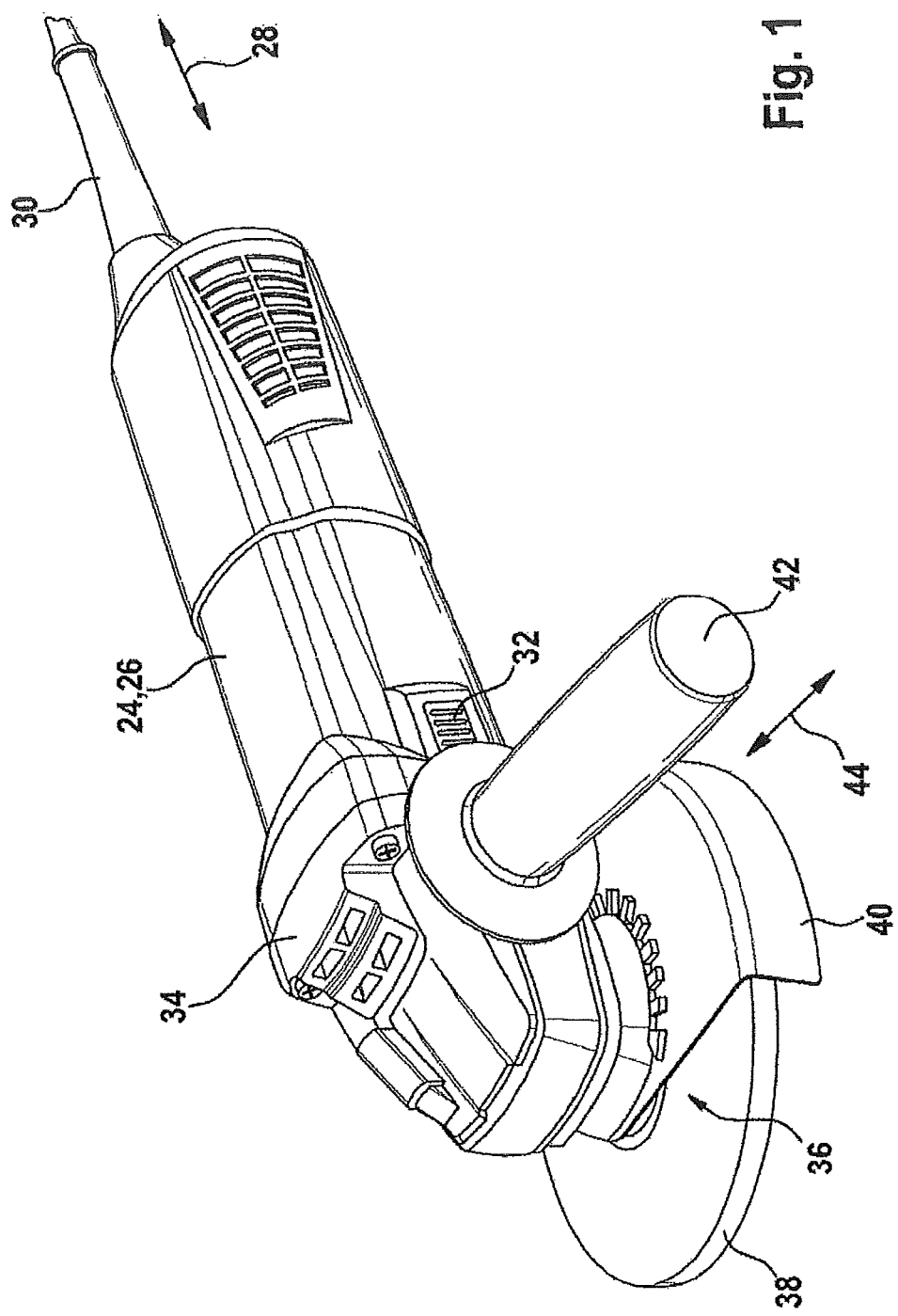
FIG. 1 shows a perspective view of a hand power tool according to the disclosure.

A hand power tool is represented in FIG. 1. The hand power tool is constituted by an angle grinder. Also conceivable, however, are other designs of the hand power tool considered appropriate by persons skilled in the art, such as, for example, a power drill, hammer drill, oscillating hand power tool or orbital sander. The hand power tool comprises a housing 24. The housing 24 is made of a plastic. The housing 24 constitutes a main handle 26, which is provided to be gripped by an operating hand of an operator. A power cable 30 is disposed at one end of the housing 24, as viewed in the direction of main extent 28 of the hand power tool. The power cable 30 is provided to supply electrical energy to a drive unit 10 of the hand power tool. The power cable 30 is provided to be connected to an electrical power network. For this purpose, the power cable 30 has a plug element, not represented. It is also conceivable, however, for the hand power tool to be constituted by a battery-powered hand power tool. The hand power tool additionally has a switching element 32, which is designed to be operated by an operator. The switching element 32 is provided to activate the drive unit 10. The switching element 32 is constituted by a slide switch.

The hand power tool additionally has a transmission housing 34. The transmission housing 34 is connected to the housing 24, at an end of the housing 24 opposite to the power cable 30. The transmission housing 34 is made of a metal. The transmission housing 34 is made of aluminum. The hand power tool comprises a tool receiver 36, not represented in greater detail, which is provided to receive and captively hold an insert tool 38. The insert tool 38 is constituted by an abrasive disc. The insert tool 38 is detachably connected to the tool receiver 36. The tool receiver 36 is disposed at an open end of the transmission housing 34, as viewed perpendicularly in relation to the direction of main extent 28 of the hand power tool. The tool receiver 36 projects out of the transmission housing 34. In addition, a protective hood 40 is coupled to the tool receiver 36. The protective hood 40 is detachably connected to the hand power tool.

The hand power tool additionally has an ancillary handle 42. The ancillary handle 42 is provided to be gripped by a further operating hand of the operator. The ancillary handle 42 is detachably coupled to the hand power tool. When the ancillary handle 42 is mounted on the hand power tool, a direction of main extent 44 of the ancillary handle 42 is perpendicular to the direction of main extent 28 of the hand power tool and parallel to a plane of main extent of the insert tool 38.

Figure 2:
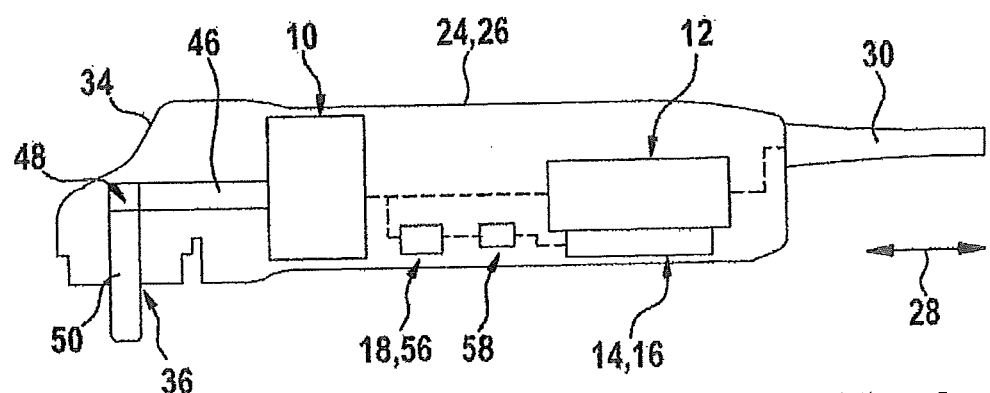
FIG. 2 shows a schematic sectional view of the hand power tool according to the disclosure.
Figure 3:
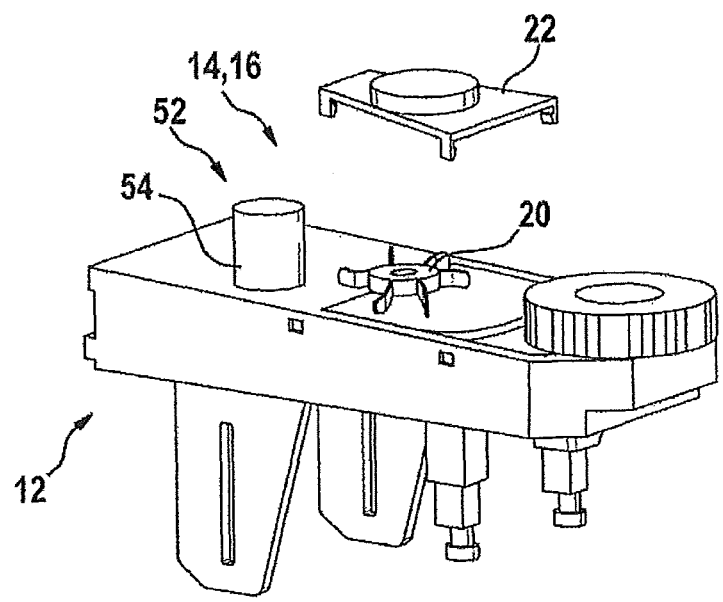
FIG. 3 shows a perspective view and a schematic representation of an after-run cooling unit of the hand power tool according to the disclosure.

The hand power tool has the drive unit 10, an electronic unit 12 and an after-run cooling unit 14 (FIG. 2). The housing 14 of the hand power tool surrounds the drive unit 10, the electronic unit 12 and the after-run cooling unit 14. The drive unit 10 comprises an electric motor. The drive unit 10 comprises an EC motor. The drive unit 10 has an output shaft 46, which is connected to a drive shaft 50 via a transmission unit 48. The transmission unit 48 has a bevel gear transmission, not represented. The drive shaft 50 is provided for driving an insert tool, not represented here, which is coupled to the tool receiver 36. The drive shaft 50 is coupled to the tool receiver 36. The drive shaft 50 is coupled to the tool receiver 36 in a form-fitting and/or force-fitting manner. The drive shaft 50 extends perpendicularly in relation to the output shaft 46. The drive shaft 50 is perpendicular to the direction of main extent 28 of the hand power tool.

The drive unit 10 is operatively connected to the electronic unit 12. The drive unit 10 is electronically connected to the electronic unit 12. The electronic unit 12 is provided for open-loop control or closed-loop control of the drive unit 10. Alternatively or additionally, the electronic unit 12 may also be provided for open-loop control or closed-loop control of a further functional unit considered appropriate by persons skilled in the art. The electronic unit 12 comprises field-effect transistors. The electronic unit 12 comprises metal-oxide semiconductor field-effect transistors (MOSFET). Alternatively or additionally, the electronic unit 12 may also comprise other electronic components considered appropriate by persons skilled in the art, such as, for example, a bipolar transistor having an insulated gate electrode (IGBT).

The after-run cooling unit 14 of the hand power tool is provided for cooling the electronic unit 12 substantially after an operating state of the drive unit 10. Alternatively or additionally, it is also conceivable, however, for the after-run cooling unit 14 to be provided for cooling the drive unit 10 or another functional unit of the hand power tool considered appropriate by persons skilled in the art. The after-run cooling unit 14 is provided for active cooling. The after-run cooling unit 14 has a fan element 20. The fan element 20 is constituted by a fan propeller. The fan element 20 is constituted by a micro-fan propeller. The fan element 20 is provided to generate a cooling stream when in an operating state. The fan element 20 is rotatably mounted on the electronic unit 12. The after-run cooling unit 14 additionally comprises a fan drive unit 52, which is provided to drive the fan element 20 in rotation. The fan drive unit 52 has a capacitor 54, which is provided to store electrical energy for driving the fan element 20 and providing it to the after-run cooling unit 14 when in an operating state. However, the fan drive unit 52 may also be realized in a different manner, considered appropriate by persons skilled in the art.

The after-run cooling unit 14 additionally comprises an air routing element 22. The air routing element 22 is constituted by an air baffle plate. When in a mounted state, the fan element 20 is disposed between the air routing element 22 and the electronic unit 12. When in a mounted state, the air routing element 22 constitutes an air flow channel, through which the cooling stream flows past the electronic unit 12 when the after-run cooling unit 14 is in an operating state. When the after-run cooling unit 14 is in an operating state, the cooling stream produced by the fan element 20 when in an operating state in this case takes up thermal energy of the electronic unit 12, and carries the thermal energy away from the electronic unit 12. The after-run cooling by the after-run cooling unit 14 is provided for removing accumulated heat that is produced after an operating state and given off by the electronic unit 12.

The hand power tool additionally has an open-loop and/or closed-loop control unit 18, which is provided for temperature-dependent and/or time-dependent open-loop and/or closed-loop control of the after-run cooling unit 14. The open-loop and/or closed-loop control unit 18 is realized as an open-loop control unit 56, and is provided for open-loop control of the after-run cooling unit 14. Alternatively or additionally, it is also conceivable for the open-loop and/or closed-loop control unit 18 to be realized as a closed-loop control unit, and to be provided for closed-loop control of the after-run cooling unit 14. The open-loop control unit 56 is provided for open-loop control of the after-run cooling unit 14 in dependence on a temperature parameter and a time parameter. The open-loop control unit 56 may additionally be provided for open-loop control of the after-run cooling unit 14 in dependence on further parameters considered appropriate by persons skilled in the art. Alternatively or additionally, it is also conceivable for the open-loop control unit 56 to be provided for manual open-loop control, for example by means of a setting knob or setting wheel, not represented, that can be actuated by an operator.

The hand power tool comprises a sensor unit 58, which is provided for sensing the temperature parameter. The sensor unit 58 is additionally provided for sensing the time parameter. A signal of the sensor unit 58 is forwarded to the open-loop control unit 56, which evaluates the signal and controls the after-run cooling unit 14 according to a predefined control algorithm. After an operating state of the drive unit 10, and with the output shaft 46 at a standstill, the open-loop control unit 58 puts the after-run cooling unit 14 into an operating state. The after-run cooling unit 14 is provided to produce a cooling stream directly after the drive unit 10 has been switched off. Alternatively, it is also conceivable for the after-run cooling unit 14 to be put into an operating state immediately or shortly after the output shaft 46 of the drive unit 10 has come to a standstill after an operating state of the drive unit 10. When in an operating state, the after-run cooling unit 14 removes accumulated heat from the electronic unit 12. The open-loop control unit 56 switches off the after-run cooling unit 14 after a predefined period of operation, or if a predefined temperature, which is sensed by the sensor unit 58 in each case, is not attained.

The hand power tool additionally has a cooling unit 16, which is provided for cooling the electronic unit 12 when the drive unit 10 is in an operating state. Alternatively or additionally, it is also conceivable, however, for the cooling unit 16 to be provided for cooling the drive unit 10 or another functional unit of the hand power tool considered appropriate by persons skilled in the art. The cooling unit 16 is provided for active cooling of the electronic unit 12. The cooling unit 16 is provided for cooling the electronic unit 12 independently of the after-run cooling unit 14. The cooling unit 16 has a fan element 20. The cooling unit 16 and the after-run cooling unit 14 are realized as a single integral piece. The after-run cooling unit 16 and the cooling unit 14 are provided for time-staggered cooling of the electronic unit 12. The cooling unit 16 is provided for cooling during an operating state of the electronic unit 12 of the hand power tool. The after-run cooling unit 14 is provided for cooling the electronic unit 12 after an operating state of the drive unit 10 of the hand power tool. The after-run cooling unit 14 cools the electronic unit 12 at least for a period of one minute after an operating state of the drive unit of the hand power tool, and thus also after an operating state of the cooling unit 16.

What is claimed is:

1. A hand power tool, comprising:
   a housing;
   a drive unit in the housing configured to drive an output shaft to move;
   an electronic unit in the housing configured to control the drive unit; and
   an after-run cooling unit in the housing including a cooling element and a further drive unit, the cooling element being configured to be driven by the further drive unit to cool one or more of the drive unit and the electronic unit,
   wherein the further drive unit is configured to receive power for driving the cooling element after the drive unit has been deactivated and movement of the output shaft has ceased.

2. The hand power tool according to claim 1, wherein the further drive unit that is configured to drive the after-run cooling unit to actively cool the one or more of the drive unit and the electronic unit after the drive unit has been deactivated and movement of the output shaft has ceased.

3. The hand power tool according to claim 1, further comprising a cooling unit separate from the after-run cooling unit and configured, at least partially, to cool one or more of the drive unit and the electronic unit when in an operating state.

4. The hand power tool according to claim 3, wherein the after-run cooling unit is configured so as to be at least partially integral with the cooling unit.

5. The hand power tool according to claim 1, further comprising at least one of an open-loop control unit and a closed-loop control unit configured, at least partially, for at least one of temperature-dependent and time-dependent control of the after-run cooling unit.

6. The hand power tool according to claim 1, wherein the after-run cooling unit has at least one fan element.

7. The hand power tool according to claim 1, wherein the after-run cooling unit comprises at least one air routing element.

8. The hand power tool according to claim 1, wherein the drive unit comprises at least one EC motor.

9. A method for cooling one or more of a drive unit and an electronic unit of a hand power tool, comprising:
supplying power to a further drive unit of an after-run cooling unit located in a housing of the hand power tool, the further drive unit being configured to drive a cooling element to cool one or more of the drive unit and the electronic unit, the power being supplied to the further drive unit after the drive unit has been deactivated and after an output shaft of the drive unit has ceased moving.

10. The hand power tool according to claim 1, wherein the hand power tool is configured as an angle grinder.

11. The hand power tool according to claim 1, wherein the after-run cooling unit is configured to cool the one or more of the drive unit and the electronic unit at least 15 seconds after the drive unit has been deactivated.

12. The hand power tool according to claim 11, wherein the after-run cooling unit is configured to cool the one or more of the drive unit and the electronic unit at least 30 seconds after the drive unit has been deactivated.

13. The hand power tool according to claim 12, wherein the after-run cooling unit is configured to cool the one or more of the drive unit and the electronic unit at least 45 seconds after the drive unit has been deactivated.

14. The hand power tool according to claim 13, wherein the after-run cooling unit is configured to cool the one or more of the drive unit and the electronic unit at least 60 seconds after the drive unit has been deactivated.

* * * * *